United States Patent

Hovis et al.

[11] Patent Number: 5,812,817
[45] Date of Patent: Sep. 22, 1998

[54] COMPRESSION ARCHITECTURE FOR SYSTEM MEMORY APPLICATION

[75] Inventors: William Paul Hovis, Rochester; Kent Harold Haselhorst, Byron; Steven Wayne Kerchberger, Rochester; Jeffrey Douglas Brown, Rochester; David Arnold Luick, Rochester, all of Minn.

[73] Assignee: International Business Machines Corporation, Armonk, N.Y.

[21] Appl. No.: 777,738

[22] Filed: Dec. 20, 1996

Related U.S. Application Data

[63] Continuation of Ser. No. 324,050, Oct. 17, 1994, abandoned.

[51] Int. Cl.$^6$ ............................ G06F 12/00; G06F 13/00
[52] U.S. Cl. .................... 395/497.04; 395/445; 395/463; 395/888
[58] Field of Search ................................. 395/403, 427, 395/444, 445, 488, 489, 497, 497.04, 888; 360/8

[56] References Cited

U.S. PATENT DOCUMENTS

| | | | |
|---|---|---|---|
| 3,670,307 | 6/1972 | Arnold et al. | 395/458 |
| 4,467,421 | 8/1984 | White | 395/445 |
| 4,593,324 | 6/1986 | Ohkubo et al. | 358/261 |
| 4,782,325 | 11/1988 | Jeppsson et al. | 341/55 |
| 5,235,695 | 8/1993 | Pence | 395/497.03 |
| 5,237,460 | 8/1993 | Miller et al. | 360/8 |
| 5,239,298 | 8/1993 | Wei | 341/51 |
| 5,247,638 | 9/1993 | O'Brien et al. | 395/888 |
| 5,278,970 | 1/1994 | Pence | 395/888 |
| 5,305,295 | 4/1994 | Chu | 369/30 |
| 5,313,604 | 5/1994 | Godwin | 395/489 |
| 5,357,614 | 10/1994 | Pattisam et al. | 395/250 |
| 5,481,701 | 1/1996 | Chambers, IV | 395/612 |
| 5,490,260 | 2/1996 | Miller et al. | 395/427 |
| 5,559,978 | 9/1996 | Spilo | 395/413 |
| 5,606,706 | 2/1997 | Takamoto et al. | 395/800 |

OTHER PUBLICATIONS

Arnold et al., "Data Compaction Storage System", IBM Technical Disclosure Bulletin, vol. 22, No. 9, pp. 4191–4193, Feb. 1980.

Hamacher et al., Computer Organization, 3rd Edition, p. 338, 1990.

*Primary Examiner*—Tod R. Swann
*Assistant Examiner*—Conley B. King, Jr.
*Attorney, Agent, or Firm*—Lance L. Vietzke; Steven R. Funk; Matthew J. Bussan

[57] ABSTRACT

A memory architecture and method of partitioning a computer memory. The architecture includes a cache section, a setup table, and a compressed storage, all of which are partitioned from a computer memory. The cache section is used for storing uncompressed data and is a fast access memory for data which is frequently referenced. The compressed storage is used for storing compressed data. The setup table is used for specifying locations of compressed data stored within the compressed storage. A high speed uncompressed cache directory is coupled to the memory for determining if data is stored in the cache section or compressed storage and for locating data in the cache.

13 Claims, 3 Drawing Sheets

COMPRESSION ARCHITECTURE FOR SYSTEM MEMORY APPLICATION

This is a Continuation of application Ser. No. 08/324,050, filed Oct. 17, 1994 now abandoned.

FIELD OF THE INVENTION

The present invention relates to a computer memory architecture and in particular an architecture for segmentation and compression of memory.

BACKGROUND OF THE INVENTION

Memory often adds the most significant product cost to many computer architectures. This cost usually can be reduced with the use of compression techniques. Historically, this has not happened, however, because of difficulties associated with memory space management. For example, a system using compression must be able to accommodate variable length data resulting from the compression. In addition, directories must exist for the compressed data, along with cache areas (working space) for uncompressed data. The control, size, and latency associated with such a system have not yielded system level solutions for memory closer to the processor than I/O.

Another tradeoff in some system designs, such as PowerPC and Object Oriented systems, is that only one object may be placed in a page. This causes a large amount of memory to be "wasted." For example, PowerPC systems use 4 KB pages. If the object placed in a page is only 200 B long, 3896 B (4096 B-200 B) is unused. This can thus result in significant amounts of unused memory space, which decreases the effective memory capacity.

SUMMARY OF THE INVENTION

The present invention provides a memory architecture with lower system cost and/or improved system memory capacity. The present invention partitions a computer memory into a cache section, a setup table, and a compressed storage. The cache section is used for storing and fetching uncompressed data which is frequently referenced. The compressed storage is used for storing compressed data. The setup table is used for specifying locations of compressed data stored within the compressed storage. A high speed uncompressed cache directory is coupled to the memory for determining if data is stored in the cache section or compressed storage and for locating data in the cache. The present invention thus effectively extends a cache within a computer by inexpensive partitioning of existing computer main memory while increasing memory capacity.

DETAILED DESCRIPTION OF THE PREFERRED EMBODIMENTS

Overview

This invention provides a hardware assisted compression architecture that significantly reduces the typical latency to processor memory as compared to conventional compression techniques. Instead of compressing the entire contents of memory, which adds to the memory latency of all accesses, the present invention reserves a portion of memory as an uncompressed cache storage. Since most memory references are to a relatively small percentage of the stored data, which is preferably stored within the cache, the present invention typically avoids accesses that require additional delay to compress or decompress data while increasing memory capacity.

The improvement includes memory elements closer to the processor than I/O subsystems. The present invention involves segmenting a computer memory into an uncompressed cache portion, a setup table, and a compressed storage portion. This has the effect of providing the processor with larger real memory capacity than what is physically present. A compression technique is typically used with this memory architecture. For example, loss-less compression techniques used with the present invention could provide a two times or greater improvement in real memory capacity. This gain is dependent on both data patterns and the chosen compression algorithm. The present invention is not dependent on any particular compression algorithm; it can use any lossless compression algorithm in general.

Memory Architecture

Figure 1:
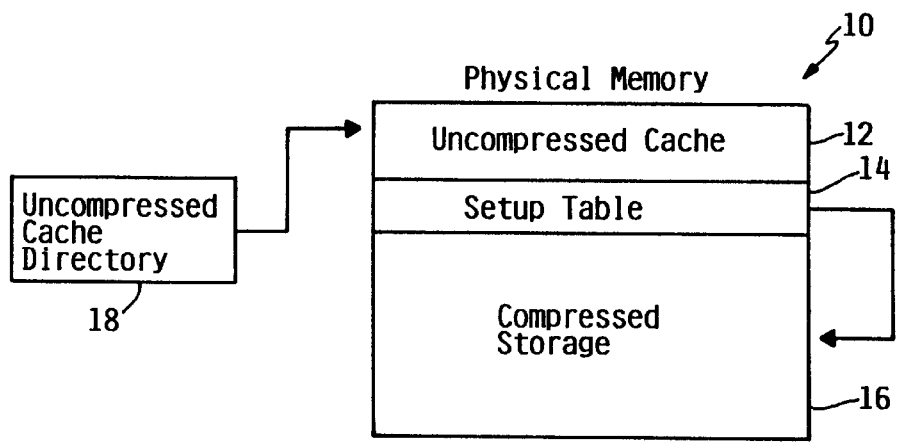
FIG. 1 is a diagram showing segmentation of a memory in accordance with the principles of the present invention.

FIG. 1 shows the partitioning of a memory in accordance with the principles of the present invention. The present invention segments a conventional computer memory 10 into an uncompressed cache 12, setup table 14, and compressed storage 16. The memory 10 is furthermore associated with an uncompressed cache directory 18, which is typically not contained within the physical memory being compressed. The other segments 12, 14, and 16 are preferably contained within the memory section to be extended by compression.

In order to improve performance, the uncompressed cache directory 18 typically has a fast access time. Within the general scheme of processor memory accesses, most memory accesses fall within a small range of the total available memory storage. A memory architecture, according to the present invention, can be used with a most recently used control scheme to maintain the most active segments of memory within the uncompressed storage cache 12. The directory 18 for uncompressed storage preferably must have a short access time in comparison to the overall access time of the uncompressed cache 12 in order to minimally impact typical accesses to memory. The function of the directory 18 is to determine if the memory access is in uncompressed cache 12 or not, and if it is in uncompressed cache, to provide the address in physical memory where the data resides.

Since most accesses will be to the uncompressed cache, additional performance degradations associated with going through compression are usually not encountered. This is true even with a proportionately small uncompressed cache. The amount of memory set aside for this cache can be either fixed or variable, but would generally be a fraction (¼, ⅛, ¹⁄₁₆, ¹⁄₃₂, etc.) of the total physical memory. This also has the additional benefit of reducing the amount of fast uncompressed cache directory required, which is preferably implemented with a fast SRAM component or on chip cache.

The function of the setup table 14 is to provide a directory for the memory locations which are in the compressed storage 16. When an access to the memory 10 misses the cache 12, it generates an access to the setup table 14. The data from this access contains the location of the data within compressed storage 16. The address results in an access to the compressed storage 16 which in turn results in compressed data being accessed and processed by the compression engine 28, which performs compression and decompression on the data. The now uncompressed data is placed in the uncompressed cache 12 and transferred to the requesting element (for a fetch), or updated and maintained within the uncompressed cache 12 (for a store).

The compressed storage area 16 of the memory 10 is most likely the physically largest segment of the three segments or portion (10, 12, 14). It contains the compressed data (which is variable in length) and is stored into a variable number of frames (physical fixed length sections of memory). These frames are inherently smaller than the data block size which is being compressed.

Figure 2:
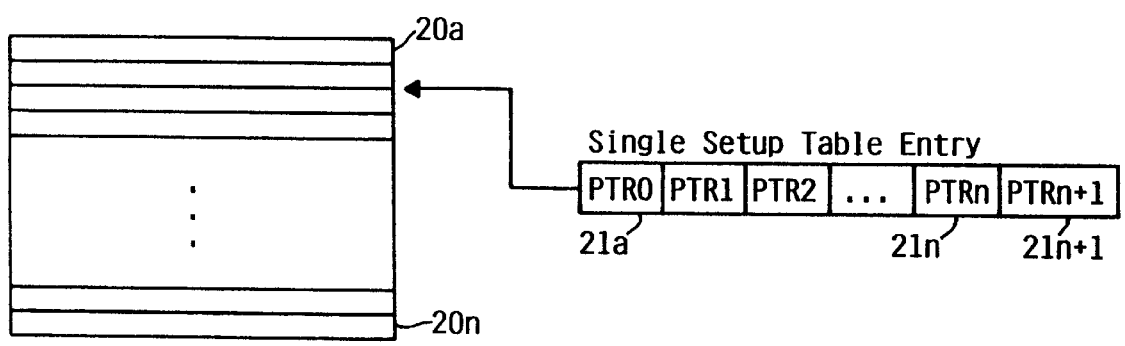
FIG. 2 is a diagram of a setup table for a memory architecture in accordance with the principles of the present invention.
Figure 3:
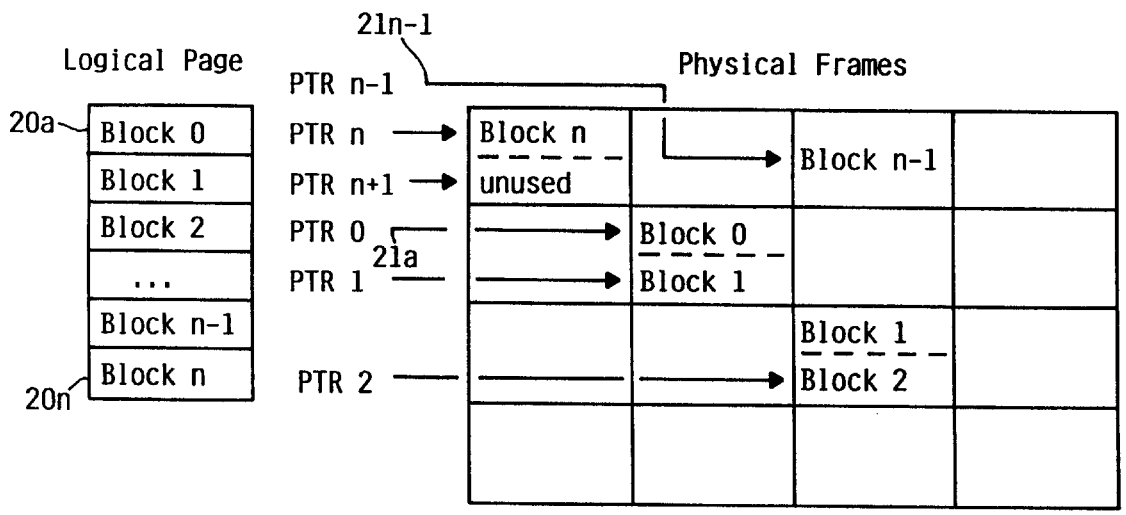
FIG. 3 is a diagram of compressed storage for a memory architecture in accordance with the principles of the present invention.

FIG. 2 is a diagram of a preferred setup table 14 for the segmented memory 10. FIG. 3 is a diagram showing the relationship between the logical pages and physical frames referenced by the setup table 14. The setup table 14 preferably contains an entry 20a–20n for every logical page whether or not it is compressed. Each entry contains n+1 pointers 21a–21n+1 where n is the number of blocks within a logical page. Each pointer 21a–21n+1 addresses the starting byte of the logical block 20a–20n in the physical mainstore. The size of the logical blocks must be less than or equal to the size of a physical frame. Because of this, the pointers also address all physical frames used (except for the n+1 pointer). The n+1 pointer is used to show where the data ends and also contains the physical addressing necessary if logical block n crosses a physical frame boundary (continues into an additional frame) (see FIG. 3).

Figure 4:
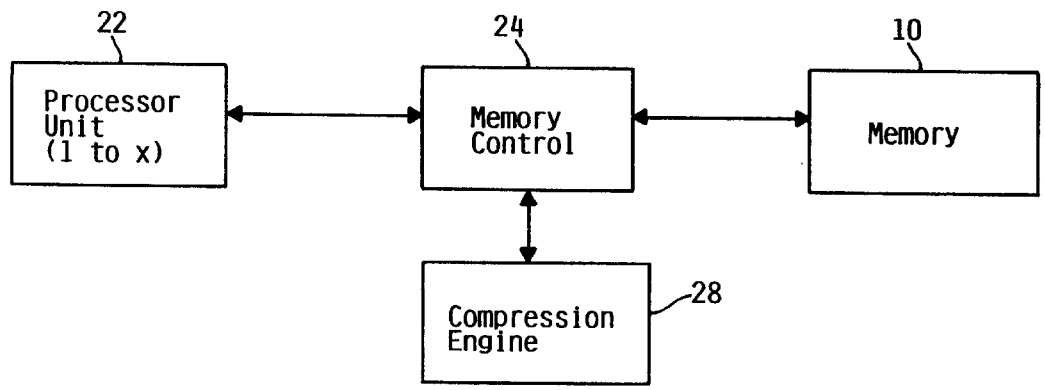
FIG. 4 is a diagram of system data flow with hardware compression assist for a memory architecture.

FIG. 4 shows a basic dataflow structure of the memory 10 with a hardware assist compression engine 28. A memory control 24 interfaces with the memory 10, compression engine 28, and processor units 22. The purpose of a hardware based compression engine 28 is to provide the necessary bandwidth and latency required by memory entities that reside close to the processor data/instruction units (i.e. L1, L2, L3). Typical software based compression techniques have limited bandwidth and significantly greater latency which would substantially degrade the processor performance. The architecture shown is merely illustrative of a possible solution. The functions shown could be integrated in any fashion without deviating from the concept of this invention.

Accesses to the memory that reside within the uncompressed cache 12 (read or write) result in the memory control accessing the uncompressed cache directory 18 for the address information and then reading or writing the data. This typically represents most of the accesses to memory. Access latency over conventional systems without compression is typically only degraded by the amount of time it takes to access the uncompressed cache directory 18. All of these operations do not involve the compression engine.

When an access to memory misses the uncompressed cache 12, it results in an access to the setup table 14 in order to fetch pointer information for indicating where the compressed data resides in the compressed storage 16. This data is sent to the compression engine which in turn uses the addresses to fetch the necessary compressed data from compressed storage 16. The data is then uncompressed and sent back to the requesting element and uncompressed cache in the memory by the compression engine 28. The latency associated with this is generally greater by a factor of 2 or 3 over an access to the uncompressed cache 12, but it happens far less frequently than accesses to the uncompressed cache 12, and therefore has a very small impact on average latency to the memory 10.

Various methods exist for controlling how this sequence occurs. The present invention is not dependent upon any particular method for this sequence. As part of this sequence, space must generally be maintained within the uncompressed cache 12 for accesses which fall within compressed storage 16. Each access to compressed storage 16 results in the data being written to the uncompressed cache 12. If the uncompressed cache 12 is full, a scheme must be used to force data back into compressed storage 16. Also, the directory for the uncompressed cache must be updated when new locations are added or when old (the least recently used) locations are removed to compressed memory 16.

Figure 5:
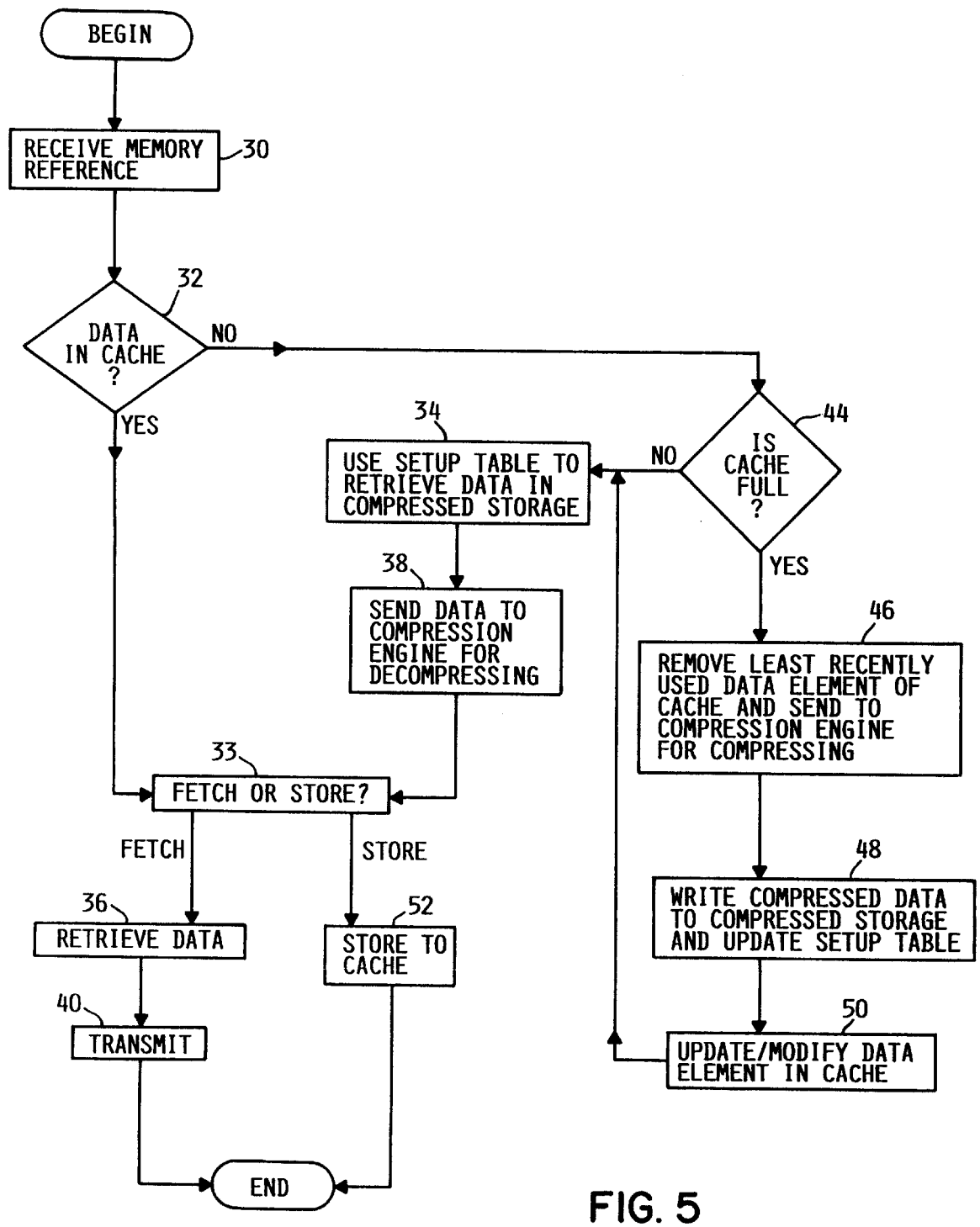
FIG. 5 is a flow chart of an exemplary process for reading and writing data from a memory that implements the present invention.

FIG. 5 is a flow chart showing examples of these methods for read and write operations using the memory architecture of the present invention. The system receives a memory reference (30) and determines if the data is in the cache (32). This is performed using the uncompressed cache directory 18 (see FIG. 1). If the data is in the cache, the system then checks whether the command was a fetch or store (33). If it was a fetch, the system then retrieves the data (36) and transmits it to the processor (40) or other requesting unit. If the command was a store, the data was just stored in the cache (52).

Otherwise, if the data is in the compressed storage the system determines if the cache is full (44). If the cache is full, then the system must do a cast out and transfer the least recently used data element in the cache to the compressed storage (48), which requires sending the data to the compression engine for compressing (46). The system then updates the data element in the cache (50) and continues as if the cache was not full. If the cache was not full, the system uses the setup table to retrieve the compressed data (34) and sends the compressed data to a compression engine for decompressing (38). The system continues as if data was in the cache.

When the memory is in use, the cache typically is always full. The system then continually shifts elements of the cache by adding new data and transfers "old" data into the compressed storage, which can occur as a background process. This is thus an example of a "most recently used" algorithm for writing data to memory. The flow charts shown in FIG. 5 is only one example of read and write operations using the memory architecture of the present invention, and other such operations are possible.

A frame table may be used to assist in determining where unused frames of memory exist within the compressed storage 16. This along with the pointer technique discussed above (FIGS. 2 and 3) allows the present invention to use non-contiguous physical frames to store logically contiguous data. However, this is not a required attribute of the basic invention.

The overall performance of the memory 10 in terms of latency to the processor is nearly identical to a memory system without compression. While there may be a slight degradation for the above mentioned reasons, the present invention provides a significant advantage of reducing overall cost by reducing the cost of the memory, or improving the capacity without adding additional memory. The overall memory capacity increase has the effect of increasing system performance.

Aspects of the control of the hardware assisted memory compression can be implemented either by hardware, software (operating system, namely memory management), or a combination of both. The present invention is not dependent upon a particular hardware or software control scheme. The compression engine is preferably implemented in hardware in order to perform the compression and decompression in a timely fashion and with sufficient bandwidth. The memory 10, furthermore, preferably includes an ability to cast out overflows to the compressed memory 16 to I/O. This is useful if the amount of defined memory space is greater than that which is physically available in the compressed storage 16. Requests to fill the additional space could result in memory being lost unless a method to cast out the same number of blocks of memory to I/O exists. This requires an ability within the operating system to support a memory system request to cast data out to I/O when full or near full. Alternatively, one could choose to set the amount of memory low enough such that the overflow situation never occurs. This would result in less benefit in terms of reducing cost or increasing capacity.

In conclusion, a method to significantly reduce system cost or to improve memory capacity has been disclosed. This technique has a minimal impact on the average latency to the memory from the processor (or requesting unit). The implementation involves a hardware compression engine and the control can be via hardware, software, or a combination of both. The overall gain could well be to cut memory cost in half (or to increase capacity by a factor of 2 with the same cost).

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A memory architecture for use with a computer, comprising:

a cache for storing uncompressed data, the cache being partitioned from a first portion of the memory;

a compressed storage for storing compressed data, the compressed storage being partitioned from a second portion of the memory non-overlapping the first portion;

a setup table, coupled to the compressed storage, for specifying locations of compressed data stored within the compressed storage, the setup table being partitioned from a third portion of the memory non-overlapping the first portion and the second portion; and a cache directory, coupled to the cache and independent of the setup table, for specifying locations of data stored within the cache, wherein the cache directory provides high-speed access to the uncompressed data when present in the cache.

2. The memory of claim 1 wherein the compressed storage is divided into a plurality of logical pages and the setup table comprises a plurality of pointers electronically linked to the logical pages of the compressed storage.

3. The memory of claim 1, further comprising command means for reading data from the memory and for writing data to the memory.

4. The memory of claim 3 wherein the command means comprises:

means for receiving a memory reference;

means for determining if the memory reference is a write command or a read command;

means for writing data to the cache; and means for retrieving data from the memory.

5. The memory of claim 4 wherein the command means further comprises:

means for using the setup table to retrieve data from the compressed storage and for sending the retrieved data to a compression engine for decompressing; and means for removing a data element from the cache, sending the data element to the compression engine for compressing, writing the compressed data element to the compressed storage, and updating the setup table accordingly.

6. The memory of claim 1, further comprising:

means for determining whether requested data is located within the cache;

means for accessing the requested data from the cache via the cache directory when the requested data is located within the cache; and means for accessing the requested data from the compressed storage via the setup table when there is a cache miss and the requested data is located within the compressed storage.

7. The memory of claim 1, wherein the cache directory has a faster memory access time than the memory access time of the cache.

8. A computer system with a partitioned memory architecture, comprising:

(a) at least one processor unit;

(b) a memory for storing data;

(c) a compression engine for compressing and decompressing data transmitted to and received from the memory;

(d) a memory control unit coupled to the processor unit, the memory, and the compression engine, the memory control unit operating to control transmission of data to and from the processor unit, the memory, and the compression engine;

wherein the memory comprises:

(i) a cache for storing uncompressed data, the cache being partitioned from a first portion of the memory;

(ii) a compressed storage for storing compressed data, the compressed storage being partitioned from a second portion of the memory non-overlapping the first portion; and (iii) a setup table, coupled to the compressed storage, for specifying locations of compressed data stored within the compressed storage, the setup table being partitioned from a third portion of the memory non-overlapping the first portion and the second portion; and (e) a cache directory, coupled to the cache and separate from the first, second and third portions of the memory, for specifying locations of data stored within the cache, wherein the cache directory provides high-speed access to the uncompressed data when present in the cache.

9. A method for providing high speed memory accesses where at least a portion of the data is compressed, comprising the steps of:

storing uncompressed data in a cache, the cache being partitioned from a first portion of a computer memory;

storing compressed data in a compressed storage, the compressed storage being partitioned from a second portion of the computer memory non-overlapping the first portion;

providing a setup table for specifying locations of compressed data stored within the compressed storage, the setup table being partitioned from a third portion of the computer memory non-overlapping the first portion and the second portion;

providing a cache directory, independent of the setup table, for specifying locations of uncompressed data stored within the cache; and accessing the uncompressed data within the cache via the cache directory when requested data is located within the cache, and accessing the compressed data within the compressed storage via the setup table when there is a cache miss and the requested data is located within the compressed storage.

10. The method of claim 9, further comprising the step of determining whether the requested data is located within the cache.

11. A memory architecture for use with a computer, comprising:

a cache for storing uncompressed data, the cache being partitioned from a first portion of a memory;

a compressed storage for storing compressed data, the compressed storage being partitioned from a second portion of the memory non-overlapping the first portion;

a setup table, coupled to the compressed storage, for specifying locations of compressed data stored within the compressed storage for memory accesses directed to the compressed storage, the setup table being partitioned from a third portion of the memory non-overlapping the first portion and the second portion; and a cache directory independent of the setup table and coupled to the cache to maintain a predetermined number of the most recently accessed data locations by removing the least recently used data location upon receiving a new data location not currently stored in the cache directory, and to provide locations of cached data stored within the cache for memory accesses directed to the cache.

12. The memory architecture of claim 11, wherein the cache directory comprises means for accessing the uncompressed data from the cache via the cache directory when requested data is located within the cache, and for accessing the compressed data from the compressed storage via the setup table when the requested data is located within the compressed storage.

13. The memory architecture of claim 12, further comprising means for determining whether the requested data is located within the cache.

* * * * *